United States Patent [19]

Yamashita et al.

[11] Patent Number: 5,675,676
[45] Date of Patent: Oct. 7, 1997

[54] OPTICAL BRANCHING APPARATUS AND TRANSMISSION LINE SWITCHING METHOD

[75] Inventors: Shuji Yamashita; Kiyoshi Sekikawa, both of Tokyo, Japan

[73] Assignee: NEC Corporation, Tokyo, Japan

[21] Appl. No.: 693,443

[22] Filed: Aug. 7, 1996

[30] Foreign Application Priority Data

Aug. 18, 1995 [JP] Japan .................................... 7-210367

[51] Int. Cl.[6] .................................................. G02B 6/28
[52] U.S. Cl. ............................ 385/24; 359/124; 359/127
[58] Field of Search .................................. 359/127, 124; 385/24, 15

[56] References Cited

U.S. PATENT DOCUMENTS

| | | | |
|---|---|---|---|
| 4,821,255 | 4/1989 | Kobrinski | 370/3 |
| 5,493,625 | 2/1996 | Glance | 385/24 |
| 5,504,607 | 4/1996 | Smith et al. | 359/124 |
| 5,604,618 | 2/1997 | Mori et al. | 359/127 |

FOREIGN PATENT DOCUMENTS

| | | |
|---|---|---|
| 0390320 | 10/1990 | European Pat. Off. . |
| 0635950 | 1/1995 | European Pat. Off. . |

*Primary Examiner*—John Ngo
*Attorney, Agent, or Firm*—Sughrue, Mion, Zinn, Macpeak & Seas, PLLC

[57] ABSTRACT

An optical branching apparatus in which a pair of optical transmission lines as reverse and forward links are branched into a plurality of lines includes a plurality of wavelength demultiplexing ports and a plurality of optical transmission media. The plurality of wavelength demultiplexing ports have wavelength demultiplexing/multiplexing units each connected to a branch point of each of the optical transmission lines to demultiplex a light beam having different wavelengths from the each optical transmission line and output demultiplexed light beams to branch destinations, and to transmit light beams having different wavelengths and input from branch sources and output a multiplexed light beam to the each optical transmission line. The plurality of optical transmission media connect the wavelength demultiplexing ports corresponding to the reverse link and the wavelength demultiplexing ports corresponding to the forward link in accordance with wavelengths of light beams which are used depending on a normal state and occurrence of a failure.

8 Claims, 4 Drawing Sheets

OPTICAL BRANCHING APPARATUS AND TRANSMISSION LINE SWITCHING METHOD

BACKGROUND OF THE INVENTION

The present invention relates to an optical branching apparatus and a transmission line switching method therefore and, more particularly, to an optical submarine branching apparatus for branching the transmission line into a plurality of communication areas for each system and its transmission line switching method.

An optical submarine branching apparatus of this type has three communication areas as a minimum unit. Each submarine cable system employs a spatial division/branching scheme having two ports corresponding to a fiber pair for each communication area.

In a conventional optical submarine branching apparatus of this type, as shown in FIG. 4, an optical submarine branching circuit having three communication areas K, L, and M formed for each system comprises optical switching circuits K1, K2, L1, L2, M1, and M2, switching signal detectors K1D, K2D, L1D, L2D, M1D, and M2D, and a switching remote control circuit 5.

The optical switching circuits K1 and K2 are arranged for two ports of the communication area K and connected to the fiber pair of a submarine cable. The optical switching circuit K1 connects an optical path P1 used in an normal state to the optical switching circuit M2 through the optical fiber. The optical switching circuit K1 connects an optical path P2 used in an abnormal state to the optical switching circuit L2 through the optical fiber. The optical switching circuit K2 connects the optical path P1 used in the normal state to the optical switching circuit L1. The optical switching circuit K2 connects the optical path P2 used in the abnormal state to the optical switching circuit M1.

The remaining optical switching circuits L1, L2, M1, and M2 are also connected in the same manner as described above, and a detailed description thereof will be omitted.

The optical switching circuit K1 connects a signal from the cable station of the communication area K to the switching signal detector K1D. Upon reception of the optical switching signal from the cable station of the communication area K, the switching signal detector K1D drives the switching remote control circuit 5 to send an optical path switching instruction to the optical switching circuit K1 and the optical switching circuit L2 serving as the connection destination of the optical path P2 used in the abnormal state of the optical switching circuit K1. In accordance with the instruction from the switching remote control circuit 5, the optical switching circuits K1 and L2 switch the optical communication path of the optical path P1 used in the normal state for communication with the communication area M to optical communication path of the path P2 used in the abnormal state and extending between the communication areas K and L.

For example, upon occurrence of a failure in a transmission line for the communication area M, this optical switching signal is transmitted to the optical switching circuit K1 from the cable station of the communication area K when the cable station of the communication area K detects a communication failure for the communication area M.

In this example, upon detection of a communication failure for the communication area M, the cable stations of the communication areas K and L output an optical switching signal to an optical switching circuit which is being communicating with the communication area M to switch a transmission line. Light transmitted from the path P1 is switched to the path P2 and transmitted through the grand branches L and K, thereby contouring communication to the destination station or forming a communication path to the destination station without using a submarine cable.

The remaining cable stations of the communication areas and the remaining optical switching circuits are operated in the same manner as described above, and a detailed description thereof will be omitted.

The conventional optical submarine branching apparatus has the switching signal circuits M1D, M2D, K1D, K2D, L1D, and L2D arranged for each port to detect the optical switching signals from the communication areas. The switching remote control circuit 5 for sending the transmission line switching instruction to each port can be shared by the ports. The circuit arrangement becomes undesirably complicated.

The cable station of a communication area requires to output an optical switching signal in sending a transmission line switching instruction to the optical submarine branching apparatus, and therefore processing is cumbersome.

SUMMARY OF THE INVENTION

It is an object of the present invention to provide an optical branching apparatus having a simple circuit arrangement and a transmission line switching method therefor.

It is another object of the present invention to provide an optical branching apparatus capable of simplifying processing in the cable station of a communication area and a transmission line switching method therefor.

In order to achieve the above objects of the present invention, there is provided an optical branching apparatus in which a pair of optical transmission lines as reverse and forward links are branched into a plurality of lines, comprising a plurality of wavelength demultiplexing ports having wavelength demultiplexing/multiplexing means, each connected to a branch point of each of the optical transmission lines, for demultiplexing a light beam having different wavelengths from the each optical transmission line and outputting demultiplexed light beams to branch destinations, and for transmitting light beams having different wavelengths input from branch sources and outputting a multiplexed light beam to the each optical transmission line, and a plurality of optical transmission media for connecting the wavelength demultiplexing ports corresponding to the reverse link and the wavelength demultiplexing ports corresponding to the forward link in accordance with wavelengths of light beams which are used depending on a normal state and occurrence of a failure.

DESCRIPTION OF THE PREFERRED EMBODIMENTS

The preferred embodiments of the present invention will be described with reference to the accompanying drawings.

Figure 1:
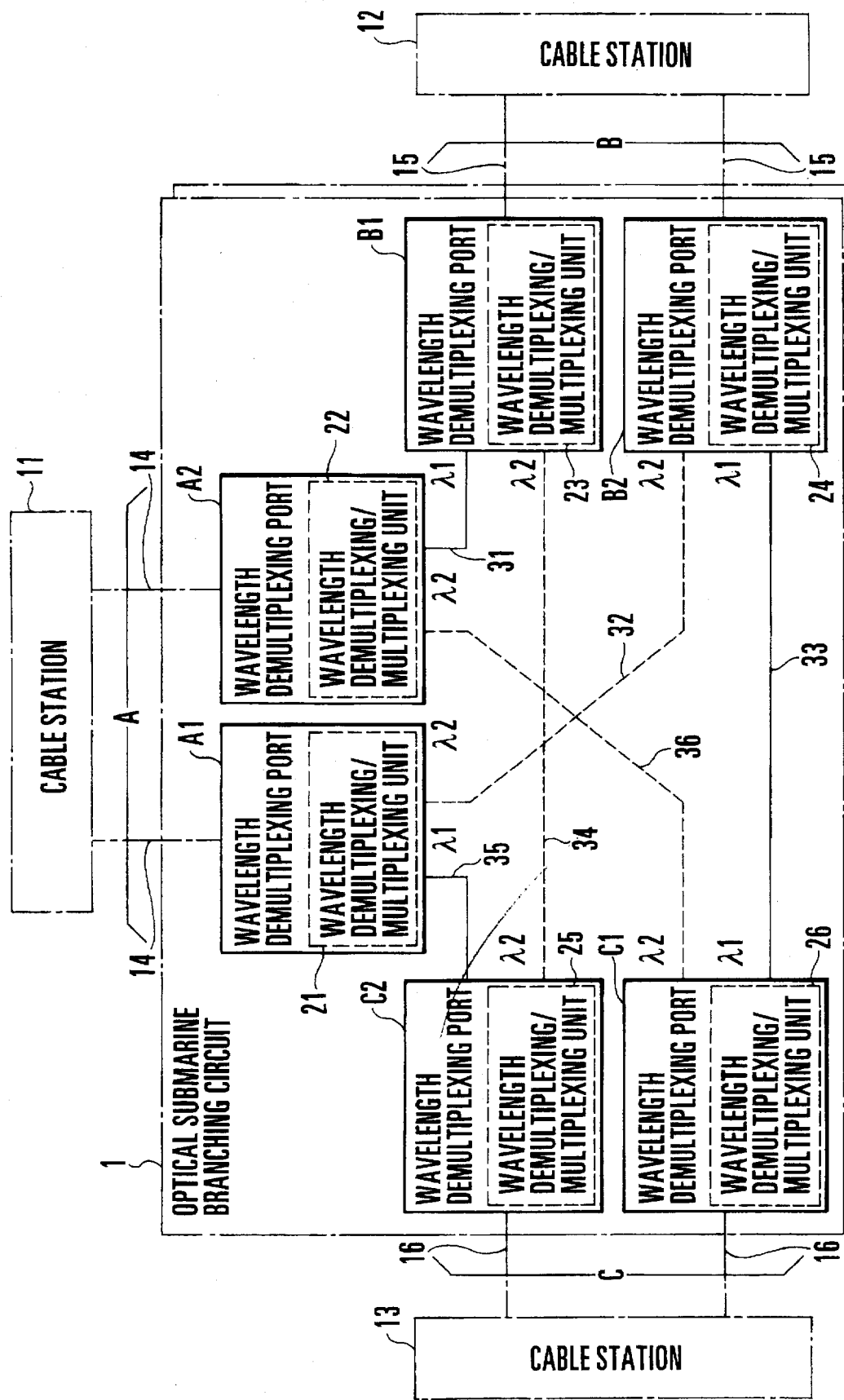
FIG. 1 is a block diagram showing an optical submarine branching apparatus according to the first embodiment of the present invention.

FIG. 1 shows an optical submarine branching apparatus according to the first embodiment of the present invention. An optical submarine branching apparatus comprises first and second systems respectively having identical optical submarine branching circuits 1 and 2 having different transmission destinations between communication areas. The optical submarine branching circuit 1 has a pair of wavelength demultiplexing ports A1 and A2, a pair of wavelength demultiplexing ports B1 and B2, and a pair of wavelength demultiplexing ports C1 and C2, respectively corresponding to three communication areas A, B, and C. The wavelength demultiplexing ports A1, A2, B1, B2, C1, and C2 comprise wavelength demultiplexers/multiplexers 21 to 26 for demultiplexing light beams having wavelengths $\lambda 1$ and $\lambda 2$ input from optical fiber pairs 14 to 16 constituting the submarine cables connected to cable stations 11 to 13 of the communication areas A, B, and C, and for transmitting light beams having the wavelengths $\lambda 1$ and $\lambda 2$ input from other ports and outputting the transmitted light beams to the optical fiber pairs 14 to 16.

Each arbitrary pair of the wavelength demultiplexing ports A1, A2, B1, B2, C1, and C2 are connected through a corresponding one of optical fibers 31 to 36 serving as optical transmission media. More specifically, a light beam having the wavelength $\lambda 1$ is transmitted between the wavelength demultiplexing ports A2 and B1 in the A-B communication area path through the optical fiber 31, and a light beam having the wavelength $\lambda 2$ is transmitted between the wavelength demultiplexing ports A1 and B2 in the A-B communication area path through the optical fiber 32. A light beam having the wavelength $\lambda 1$ is transmitted between the wavelength demultiplexing ports B2 and C1 in the B-C communication area path through the optical fiber 33, and a light beam having the wavelength $\lambda 2$ is transmitted between the wavelength demultiplexing ports B1 and C2 in the B-C communication area path through the optical fiber 34. A light beam having the wavelength $\lambda 1$ is transmitted between the wavelength demultiplexing ports C2 and A1 in the C-A communication area path through the optical fiber 35, and a light beam having the wavelength $\lambda 2$ is transmitted between the wavelength demultiplexing ports C1 and A2 in the C-A communication area path through the optical fiber 36.

A communication failure due to the failure of a submarine cable consisting of optical fiber transmission lines 16 to the communication area C will be described with reference to FIGS. 1 and 2.

In the normal state, a light beam having the wavelength $\lambda 1$ is used in communications between the cable stations 11 to 13 of the communication areas A, B, and C, and the optical fibers 31, 33, and 35 are used in the optical submarine branching circuit 1. For example, in the first system including the optical submarine branching circuit 1, one-way communications are performed using the optical fibers 31, 33, and 35 and the light beam having the wavelength $\lambda 1$ from the communication area A to the communication area C, from the communication area C to the communication area B, and from the communication area B to the communication area A. In the second system including the optical submarine branching circuit 2, one-way communications are performed using the optical fibers 31, 33, and 35 and the light beam having the wavelength $\lambda 1$ from the communication area A to the communication area B, from the communication area B to the communication area C, and from the communication area C to the communication area A in a direction reverse to that of the first system. The first and second systems cooperate to achieve two-way communications between the communication areas A, B, and C.

Figure 2:
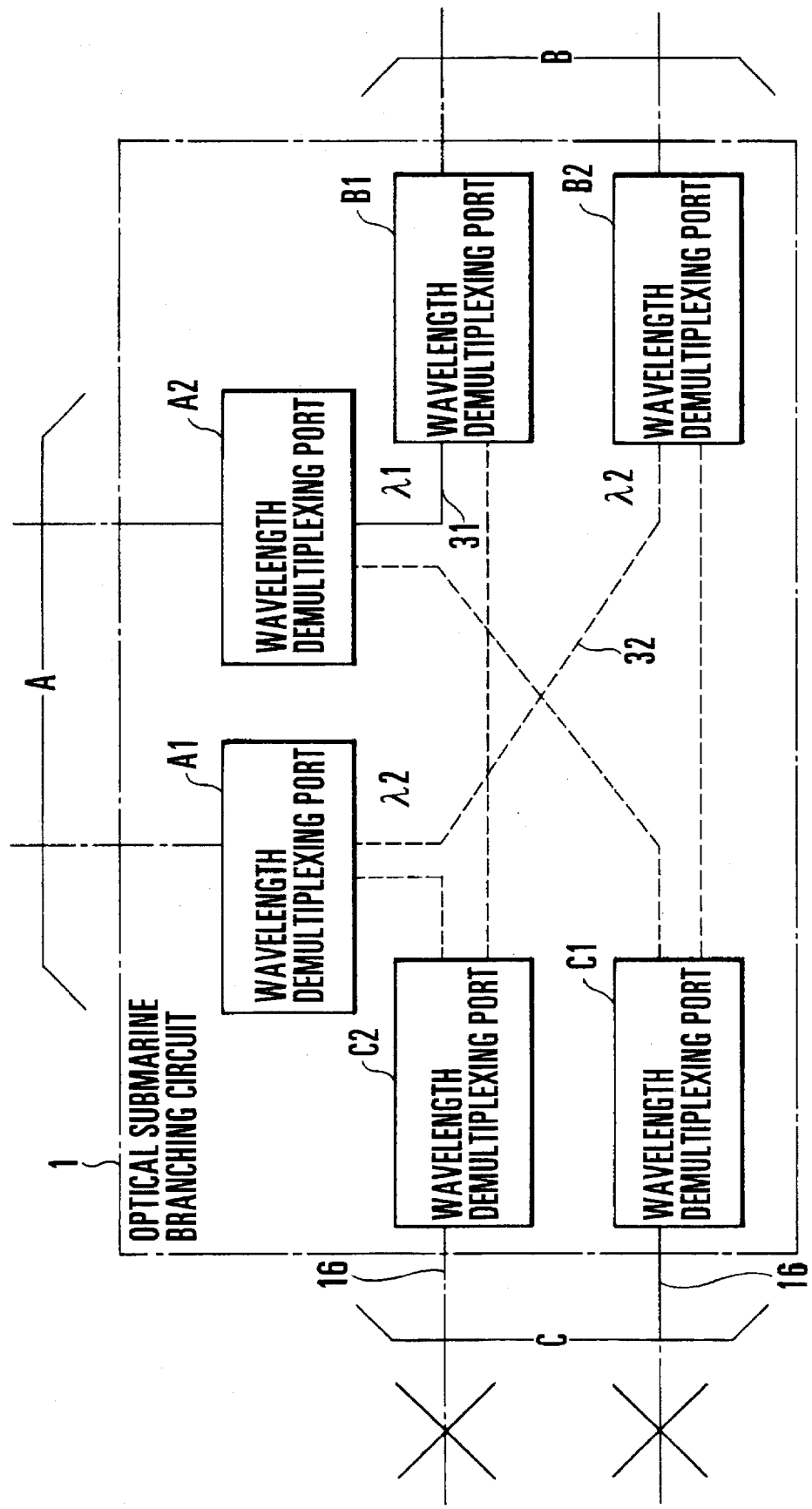
FIG. 2 is a block diagram for explaining transmission line switching upon occurrence of a failure in a submarine cable.

In this state, assume that a failure has occurred in the optical fiber transmission lines 16 of the communication area C, as shown in FIG. 2. The cable stations 11 and 12 of the communication areas A and B detect this failure. The cable station 11 of the communication area A stops transmitting the light beam having the wavelength $\lambda 1$ to the wavelength demultiplexing port A1 of the optical submarine branching circuit 1 of the first system. The cable station 12 of the communication area B stops transmitting the light beam having the wavelength $\lambda 1$ to the wavelength demultiplexing port B2 of the optical submarine branching circuit 2. Upon acquiring use permission of the transmission line of the communication area B, the cable station 11 of the communication area A transmits a light beam having the wavelength $\lambda 2$ to the wavelength demultiplexing port A1 of the optical submarine branching circuit 1 of the first system and communicates with the cable station 21 of the communication area B through the wavelength demultiplexing port A1, the optical fiber 32, and the wavelength demultiplexing port B2. Upon acquiring use permission of the transmission line of the communication area A, the cable station 12 of the communication area B transmits a light beam having the wavelength $\lambda 2$ to the wavelength demultiplexing port B2 of the optical submarine branching circuit 2 of the second system and communicates with the cable station 11 of the communication area A through the wavelength demultiplexing port B2, the optical fiber 32, and the wavelength demultiplexing port A1.

Normal communication is performed between the communication areas A and C using the light beam having the wavelength $\lambda 1$ through the wavelength demultiplexing ports A2 and B1 of the first and second systems and the optical fiber 31. When the number of transmission line circuits between the communication areas A and B becomes short due to a failure in the transmission line 16 of the communication area C, a ground circuit or satellite circuit is used, or the communication is set in a standby mode.

As described above, according to this embodiment, the optical transmission line can be switched without outputting an optical switching signal in the cable stations 11 to 13 to the optical submarine branching apparatus or without performing remote switching control in the optical submarine branching apparatus.

Figure 3:
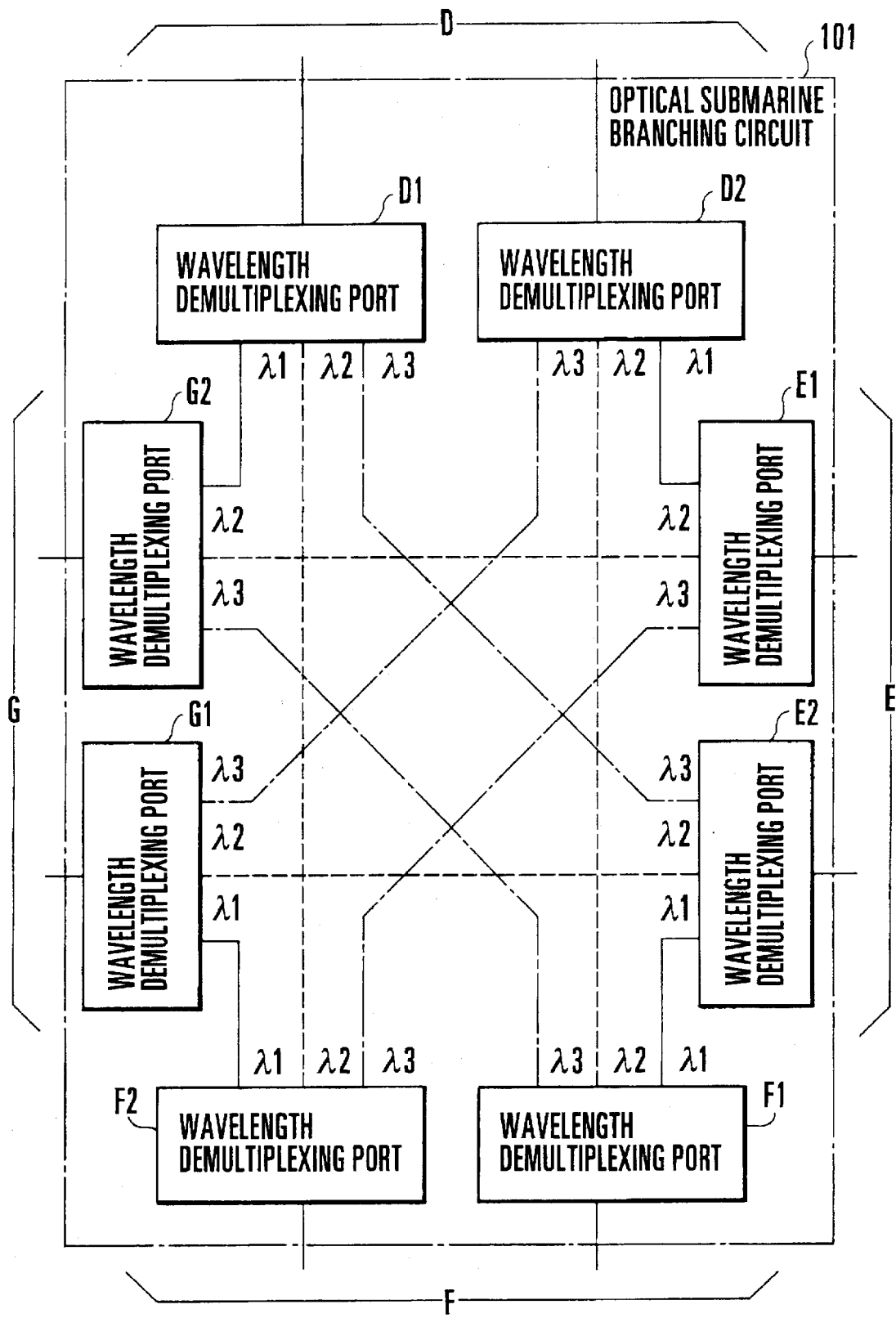
FIG. 3 is a block diagram showing an optical submarine branching apparatus according to the second embodiment of the present invention.
Figure 4:
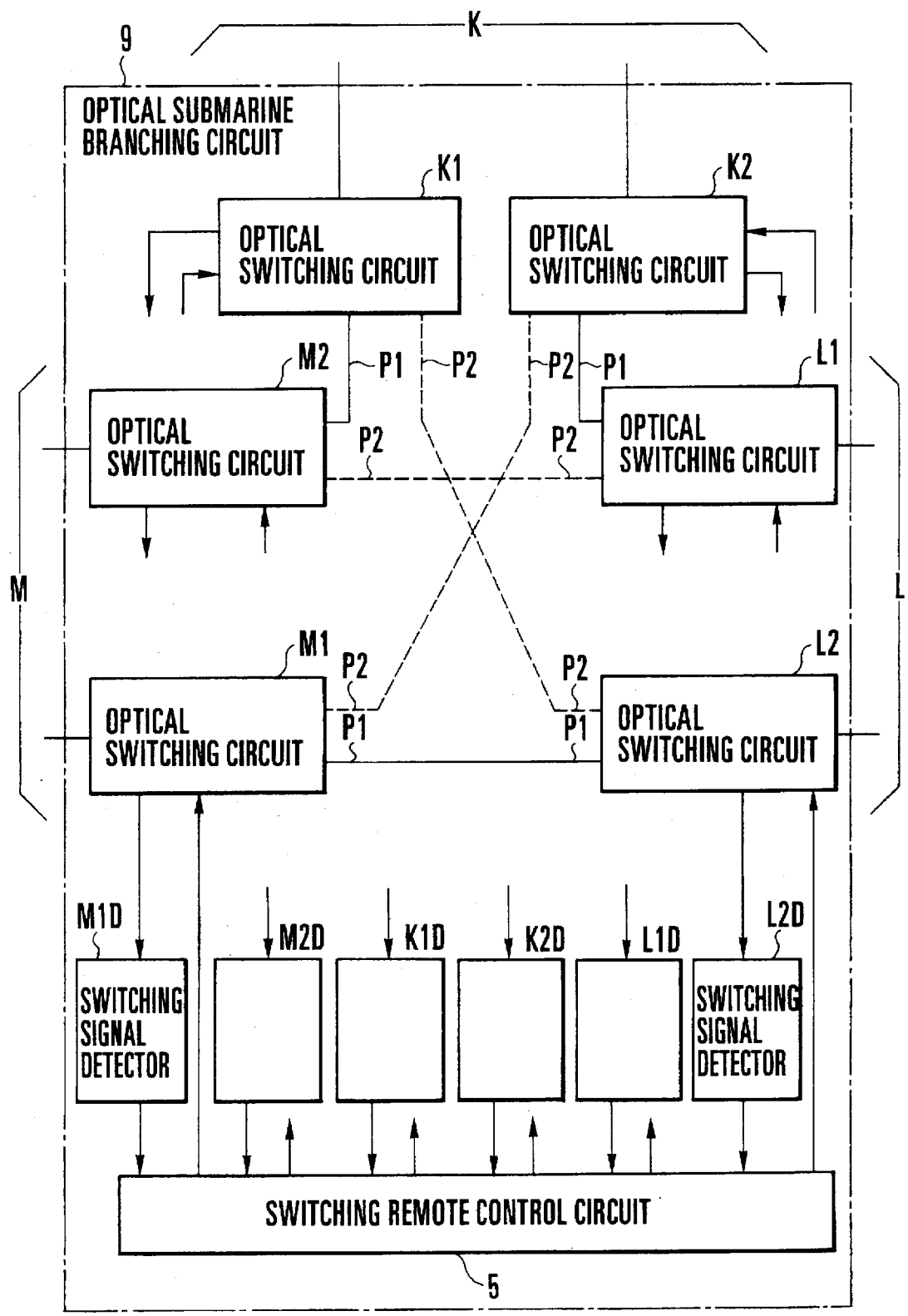
FIG. 4 is a block diagram showing a conventional optical submarine branching apparatus.

FIG. 3 shows an optical submarine branching apparatus according to the second embodiment of the present invention. An optical submarine branching circuit 101 forms one system of the optical submarine branching apparatus and comprises a pair of wavelength demultiplexing ports D1 and D2, a pair of wavelength demultiplexing ports E1 and E2, a pair of wavelength demultiplexing ports F1 and F2, and a pair of wavelength demultiplexing ports G1 and G2 for four communication areas A, B, C, and D. Each arbitrary pair of the wavelength demultiplexing ports D1, D2, E1, E2, F1, F2, G1, and G2 are connected through a corresponding one of optical fibers serving as optical transmission media as in FIG. 1.

Each of the wavelength demultiplexing ports D1, D2, E1, E2, F1, F2, G1, and G2 has a wavelength demultiplexing/multiplexing unit for demultiplexing a light beam having wavelengths $\lambda 1$, $\lambda 2$, and $\lambda 3$ input from the external submarine cable and outputting the demultiplexed light beams to the three internal optical fibers. Each demultiplexing/multiplexing unit transmits the light beams having the wavelengths $\lambda 1$, $\lambda 2$, and $\lambda 3$ input from the internal optical fibers and outputs the multiplexed light beam to the external submarine cable.

As shown in FIG. 3, a light beam having the wavelength $\lambda 1$ is transmitted between the wavelength demultiplexing ports D1 and G2 in a path of the adjacent communication areas D and G. A light beam having the wavelength λ2 is transmitted between the wavelength demultiplexing ports D2 and G1 in the D-G communication area path. A light beam having the wavelength λ3 is transmitted between the wavelength demultiplexing ports D2 and F1 in a path of the opposing communication areas D and F.

Similarly, in paths of the adjacent communication areas G and F, F and E, and E and D, light beams having the wavelength λ1 are transmitted between the wavelength demultiplexing ports G1 and F2, between the wavelength demultiplexing ports F1 and E2, and between the wavelength demultiplexing ports E1 and D2. Light beams having the wavelength λ3 are transmitted between the wavelength demultiplexing ports G1 and F1, between the demultiplexing ports F2 and E1, and between the wavelength demultiplexing ports E2 and D1. Light beams having the wavelength λ2 are transmitted between the wavelength demultiplexing ports E1 and G2 and between the wavelength demultiplexing ports E2 and G1 in a path of the opposing communication areas E and G.

According to this structure, the cable station of each communication area uses the light beam having the wavelength λ1 in the normal state and can communicate with the remaining cable stations through the wavelength demultiplexing ports of the opposing communication areas. The cable station of each communication area can communicate with the opposing communication area through another system including the optical submarine branching circuit 101 using the light beam having the wavelength λ2. In this state, when a failure has occurred in the transmission line of one communication area, the corresponding cable station sends a light beam having the wavelength λ3 predetermined for the occurrence of the failure and different from the light beam in the normal state to the submarine cable. The light beams received by the wavelength demultiplexing port can be transmitted to the desired transmission line.

In the above description, an optical submarine branching circuit formed in each system has three or four communication areas. However, the number of communication areas may be five or more. For the descriptive convenience for the structure of the optical submarine branching apparatus and optical transmission processing of the cable stations, the number of wavelengths of the light beams transmitted to the optical submarine branching apparatus is given as N−1 with respect to the number N of communication areas. However, predetermined rules may be determined, and the optical submarine branching apparatus may transmit light beams having wavelengths whose number is N or more for each of the plurality of systems (optical submarine branching circuits).

In the above description, two-way communications are performed between the cable stations of the respective communication areas of the plurality of systems. However, one-way communications may be performed in one system. In this case, the pair of wavelength demultiplexing ports of each port need not require a wavelength demultiplexing/multiplexing unit, but has a wavelength demultiplexing unit and a wavelength multiplexing unit in the reverse and forward links, respectively. By switching the optical fiber pair in exchange of information on each cable station, only one optical branching circuit may be used commonly for the plurality of systems.

As has been described above, according to the present invention, there is provided an optical submarine branching apparatus including wavelength demultiplexing ports constituting a pair connected to the submarine cable for each communication area to demultiplex an external light beam having different wavelengths and output the demultiplexed light beams to an internal circuit of the apparatus, and to transmit internal light beams having different wavelengths and output the multiplexed light beam to an external circuit, and optical transmission media for internally connecting the wavelength demultiplexing ports for each system. With this arrangement, remote control transmission line switching control need not be performed, and the circuit of each system can be simplified.

A cable station using this optical submarine branching apparatus uses simple processing for changing the wavelength of an output light beam to a predetermined wavelength and outputting the resultant light beam, thereby switching the transmission lines.

What is claimed is:

1. An optical branching apparatus in which a pair of optical transmission lines as reverse and forward links are branched into a plurality of lines, comprising:

a plurality of wavelength demultiplexing ports having wavelength demultiplexing/multiplexing means, each connected to a branch point of each of said optical transmission lines, for demultiplexing a light beam having different wavelengths from said each optical transmission line and outputting demultiplexed light beams to branch destinations, and for transmitting light beams having different wavelengths input from branch sources and outputting a multiplexed light beam to said each optical transmission line; and a plurality of optical transmission media for connecting said wavelength demultiplexing ports corresponding to the reverse link and said wavelength demultiplexing ports corresponding to the forward link in accordance with wavelengths of light beams which are used depending on a normal state and occurrence of a failure.

2. An apparatus according to claim 1, wherein when said each optical transmission line is branched to N ordered communication areas, each of said wavelength demultiplexing ports demultiplexes a light beam having N−1 ordered different wavelengths, and each of said wavelength demultiplexing ports comprises a first optical fiber for connecting an optical output end of a superordinate wavelength demultiplexing port corresponding to the reverse link to said wavelength demultiplexing port corresponding to the forward link in accordance with a communication area order, and a second optical fiber for connecting an optical output end of a subordinate wavelength demultiplexing port corresponding to the reverse link to said wavelength demultiplexing port corresponding to the forward link in accordance with a reverse communication area order.

3. An apparatus according to claim 2, wherein when the number of communication areas is 3, said each wavelength demultiplexing port demultiplexes a light beam having first and second wavelengths different from each other, said first optical fiber transmits a light beam having the first wavelength output from said wavelength demultiplexing port corresponding to the reverse link to said wavelength demultiplexing port corresponding to the forward link in accordance with the communication area order, and said second optical fiber transmits a light beam having the second wavelength output from said wavelength demultiplexing port corresponding to the reverse link to said wavelength demultiplexing port corresponding to the forward link in accordance with the reverse communication area order.

4. An apparatus according to claim 3, wherein the light beam having the first wavelength is used in the normal state, and the light beam having the second wavelength is used upon occurrence of the failure in a destination optical transmission line.

5. An apparatus according to claim 1, further comprising a plurality of systems which have different relationships between optical branch sources and optical branch destinations and each of which has identical wavelength demultiplexing ports and identical optical transmission media.

6. An apparatus according to claim 1, wherein said optical transmission lines constitute submarine cables for connecting said wavelength demultiplexing ports and cable stations of a plurality of communication areas, and said wavelength demultiplexing ports and said optical transmission media constitute an optical submarine branching apparatus for branching said submarine cables on a sea bottom.

7. A transmission line switching method for an optical branching apparatus including a plurality of wavelength demultiplexing ports having wavelength demultiplexing/multiplexing means, each connected to a branch point of each of a pair of optical transmission lines as reverse and forward links branched into a plurality of lines, for demultiplexing a light beam having different wavelengths from said each optical transmission line and outputting demultiplexed light beams to branch destinations, and for transmitting light beams having different wavelengths input from branch sources and outputting a multiplexed light beam to said each optical transmission line, and a plurality of optical transmission media for connecting said wavelength demultiplexing ports corresponding to the reverse link and said wavelength demultiplexing ports corresponding to the forward link in accordance with wavelengths of light beams, comprising the steps of:

performing communications using a light beam having a predetermined wavelength in a normal state; and upon detection of a failure of a destination optical transmission line, transmitting a light beam having a wavelength different from that in the normal state to another transmission destination.

8. A method according to claim 7, wherein when the number of communication areas is 3, each of said wavelength demultiplexing ports demultiplexes a light beam having first and second wavelengths different from each other, communications are performed using the light beam having the first wavelength in the normal state, and the light beam having the second wavelength is transmitted to said another transmission destination upon detection of the failure of said destination transmission line.

* * * * *